June 29, 1965 J. L. BRILL ETAL 3,192,184
PREPOLYMERIZATION PROCESS
Filed March 19, 1959 2 Sheets-Sheet 1

INVENTORS
JOHN LEWIS BRILL
EMMETTE FARR IZARD

BY

ATTORNEY

June 29, 1965  J. L. BRILL ETAL  3,192,184
PREPOLYMERIZATION PROCESS
Filed March 19, 1959  2 Sheets-Sheet 2

INVENTORS
JOHN LEWIS BRILL
EMMETTE FARR IZARD

BY

ATTORNEY 3,192,184
PREPOLYMERIZATION PROCESS
John Lewis Brill, Newark, Del., and Emmette Farr Izard, Buffalo, N.Y., assignors to E. I. du Pont de Nemours and Company, Wilmington, Del., a corporation of Delaware
Filed Mar. 19, 1959, Ser. No. 800,475
5 Claims. (Cl. 260—75)

This invention relates to the continuous production of low molecular weight polymers, and more particularly to a process and apparatus for continuously producing a prepolymer (i.e., a low molecular weight polymer) from bis-2-hydroxy ethyl terephthalate or a low polymer thereof.

In the continuous production of low molecular weight polymers from monomeric substances which polymerize with the evolution of vaporous by-products, such as in the preparation of polyethylene terephthalate from bis-2-hydroxy ethyl terephthalate, the monomer is converted into prepolymer from essentially a melt pool, either in a stages, viz., a prepolymerization stage and a finishing stage. In the prepolymerization stage the monomer is converted into prepolymer from essentially a mlt pool, either in a pot or in a multiple column type of reactor. This process, conducted under moderate vacuum, takes one hour or more to complete with the result that the partially polymerized material is held up in the apparatus at the severe temperatures necessary for the evacuation of excess vaporous by-products. This material is in the form of a fairly stagnant pool, and consequently, varying amounts of degradation products tend to form. Subsequently, in order to make acceptable films or filaments from the polymer, these degradation products must be removed by means of expensive and often time-consuming filtration and/or extraction steps later in the process.

An object of this invention, therefore, is to provide a process for the continuous polymerization of polymerizable monomers, or low molecular weight polymers thereof, which polymerize with the evolution of vaporous by-products, the conditions which characterize said process being such that degradation of the polymeric products is substantially reduced. A more specific object is to provide for the continuous production of prepolymer from bis-2-hydroxy ethyl terephthalate, or a low molecular weight polymer thereof, under conditions such that glycol is efficiently and rapidly released from the polymerizing material, and degradation of the prepolymer formed is substantially avoided. Still another object is to provide novel apparatus particularly adapted for carrying out the continuous production of prepolymer with the efficient and rapid removal of vaporous by-product. The foregoing and additional objects will more clearly appear from the description which follows.

These objects are realized by the present invention, which briefly stated, comprises continuously flowing a liquid polymerizable material from the group consisting of polymerizable organic monomers and low molecular weight polymers thereof which polymerize with the evolution of vaporous by-products, said low molecular weight polymers having intrinsic viscosities not greater than 0.25, downwardly and by force of gravity over a substantially vertical surface provided with surface protuberances such as spiral ridges, fins, flutes, grooves or other surface modification effective to promote distribution of the liquid as a film over the entire surface area, maintaining the film at an elevated temperature and reduced pressure effective to promote progressive polymerization of the film with evolution of vaporous by-product as the film flows down the surface, continuously removing the evolved vaporous by-product in a stream flowing counter-current to the direction of flow of the film, and continuously collecting polymer from said surface at the lower extremity thereof.

The process of this invention will now be described with specific reference to the continuous production of a prepolymer of bis-2-hydroxy ethyl terephthalate which for purposes of this invention, is defined as a low molecular weight polymer of bis-2-hydroxy ethyl terephthalate having an intrinsic viscosity in the range of from 0.08 to 0.40. Intrinsic viscosity, denoted by the symbol $(n_0)$, is a measure of the degree of polymerization and may be defined as:

$$\text{Limit } \frac{\ln (n_r)}{C} \text{ as } C \text{ approaches } 0$$

wherein $n_r$ is the viscosity with dilute phenol-tetrachloroethane (60/40) solution of the polyester divided by the viscosity of the phenol-tetrachloroethane mixture per se measured in the same units at the same temperature, and $C$ is the concentration in grams of polyester per 100 cc. of solution.

The liquid material fed to the apparatus and treated in accordance with the process of the present invention essentially comprises bis-2-hydroxy ethyl terephthalate and/or a low molecular weight polymer thereof having an intrinsic viscosity not greater than 0.25. The contents of the liquid feed may also include small quantities of ethylene glycol; an alkyl ester of terephthalic acid, e.g., dimethyl terephthalate; and quantities of a half ester of glycol and terephthalic acid.

Bis-2-hydroxy ethyl terephthalate and/or low molecular weight polymer thereof having an intrinsic viscosity not greater than 0.25 is converted to the prepolymer by maintaining the liquid film at a temperature within the range of from 260° to 350° C., and preferably within the range of from 270° to 315° C., and an absolute pressure of from 0.1 to 50 mm. of mercury, and preferably from 5 to 15 millimeters of mercury, to facilitate rapid distillation of the evolved glycol which is removed from the zone of reaction in an upwardly flowing (i.e., counter-current) stream. The ultimate viscosity or degree of polymerization obtainable in the process of this invention is limited by that which permits efficient handling of the ploymerizing mass. In other words, the viscosity of the liquid polymerizing mass must be low enough to permit free flow in a manner hereinafter set forth. In the case of handling prepolymer of bis-2-hydroxy ethyl terephthalate, the ultimate intrinsic viscosity of material which can be efficiently handled is about 0.4. Preferably the reaction is carried out under conditions of temperature and pressure within the ranges above specified such that the prepolymer formed has a viscosity of from 0.12 to 0.35.

An important feature of the present invention resides in the provision of means for obtaining a continuous, i.e., unbroken, film of flowing polymerizable liquid over the substantially vertical surface over which the polymerizable liquid is caused to flow by gravity. Attempts to flow the liquid over a vertically disposed plane surface were unsuccessful for the reason that the bulk of the liquid tended to form foamy balls which rolled rapidly down the surface in well defined channels, and the material remaining as a film moved sluggishly with the result that polymerization was non-uniform, and only a negligible increase in inherent viscosity could be realized irrespective of the initial viscosity of the liquid feed. We have found, however, that if the vertical surface is provided with suitable protuberances, as hereinafter described, the surface is satisfactorily wetted and the liquid flows as a continuous film with a substantial absence of channeling or by-passing and progressive polymerization proceeds smoothly to yield a prepolymer of satisfactory inherent viscosity.

Preferred embodiments of apparatus suitable for carrying out the process of this invention are illustrated in the accompanying drawings wherein.

Figure 1:
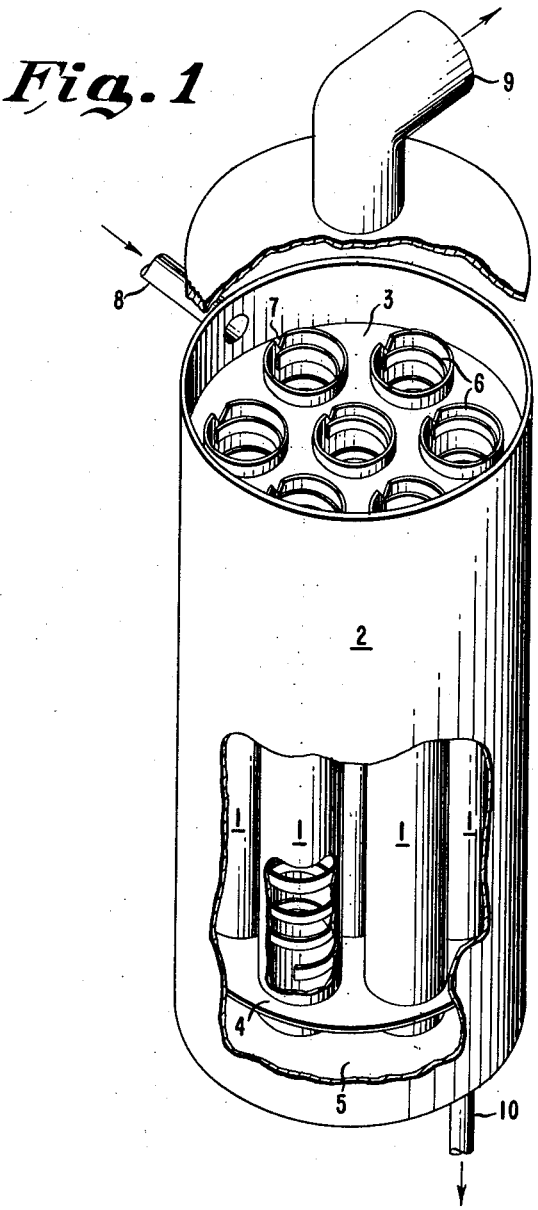
FIGURE 1 is a view, in perspective, of a preferred form of apparatus according to this invention, with parts broken away and lifted to show details of construction.

Referring to FIGURE 1 of the drawings, a plurality of elongated, open-ended tubular reaction columns, each indicated by the reference numeral 1, are vertically disposed in parallel spaced relationship in a closed cylindrical shell or casing 2 which extends substantially beyond the extremities of columns 1. A horizontal feed plate 3 disposed in shell 2 a short distance below the upper extremities of columns 1, and a second horizontal plate 4 located just above the lower extremities of columns 1, define, together with the vertical wall of the casing, an enclosed space surrounding the columns through which space a suitable heating medium may be circulated to maintain the columns at the desired temperature. The space 5 between plate 4 and the bottom end closure of the shell forms a reservoir for the collection of polymer from the columns. Each of the columns is provided on its inner surface with a continuous spiral protuberance 6, preferably of rectangular cross-section, defining a spiral channel down the length of the wall of the column. The protuberance may be integral with the wall of the column, or in the form of a helical ribbon fitted against the wall of the column, or the inner wall of the column may be grooved in a spiral path. The upper edge of each column is provided with one or more V-shaped weirs or notches 7 adapted to channel polymerizable liquid from the feed plate to the inner wall of the column. A fluid feed inlet conduit 8 with its discharge opening adjacent feed plate 3, and a vacuum duct 9 leading to a conventional vapor take-off and recovery system (not shown) comprising a vapor reflux section and condenser, are located at the upper end of the shell, and an outlet 10 is provided for conducting low polymer from the reservoir at the bottom of the shell to a finisher (not shown) or to storage facilities (not shown).

In operation, the material to be polymerized, e.g., monomeric bis-2-hydroxy ethyl terephthalate or a very low molecular weight polymer thereof (having an intrinsic viscosity of 0.03–0.06), is introduced as a continuous stream thru conduit 8 onto feed plate 3 from which it overflows thru weirs 7 and by gravity flows downwardly over the inner walls of the columns and into the reservoir 5 below the columns. The liquid being processed does not flow in the channel formed between the spiral protuberances, but rather is forced out of the channel by the formation of gas bubbles formed at the wall of the column and then flows downwardly over a number of coils of the spiral protuberance, re-enters the channel for a short distance, is again forced out and over the protuberance, and so on with the result that the entire wall of the column is wetted with the liquid which flows downwardly as a substantially continuous film. During the downward flow thru the column, the liquid is subjected to temperatures of 240°–350° C. maintained by circulation of a suitable heating medium surrounding the columns, and to pressures of 0.1–50 millimeters of mercury. Pressure reduction and the removal of vaporous by-products (i.e., ethylene glycol) is accomplished by application of vacuum thru duct 9.

This process may be successfully used either in a two- or three-stage polymerization process for polyethylene terephthalate. It may be utilized in a first stage (flasher) operation to remove 60%–80% of the excess ethylene glycol in a few minutes time with the resulting product having an intrinsic viscosity of 0.08 to 0.12. This product is then readily adaptable to further processing in existing polymerization apparatus such as the prepolymerizer and finisher which are described in U.S. Patents Nos. 2,727,882 and 2,758,915. Rapid elimination of excess glycol is effected utilizing temperatures of 240–280° C. and pressures of 5–15 millimeters of mercury.

In a preferred application, the prepolymerization process of the present invention is carried out in two stages. In this embodiment, up to 85% of the excess glycol is removed from the polymerization system and a prepolymer having an intrinsic viscosity ranging between 0.15 and 0.40 is produced. Polymerization is then completed in a conventional commercial apparatus such as is described in U.S. Patent No. 2,758,915. The great advantage of this application lies in the fact that the removal of excess ethylene glycol and the preparation of a prepolymer having the desired intrinsic viscosity is carried out in a fraction of the time normally required using conventional prepolymerization processes and apparatus. The total hold-up time of monomer to finished polymer is shortened from an interval of 4 hours to less than 2½ hours. The advantages in reduction of expense of operation, increased production and substantial elimination of polymer degradation are now readily apparent. The description of this preferred embodiment may be better understood by referring to FIGURES 2 and 3 which illustrate one form of apparatus for carrying out this preferred embodiment of the present process.

Figure 2:
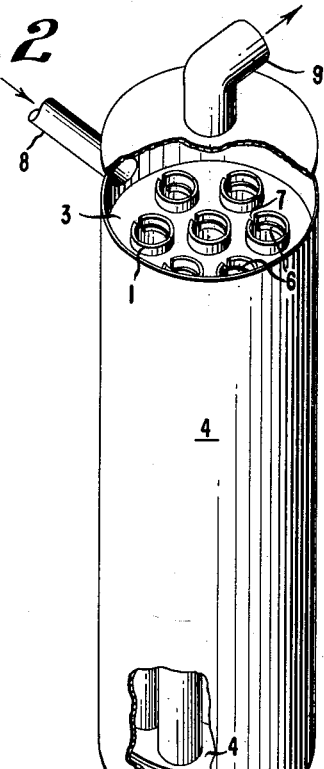
FIGURE 2 is a perspective view illustrating a two-stage form of apparatus.
Figure 3:
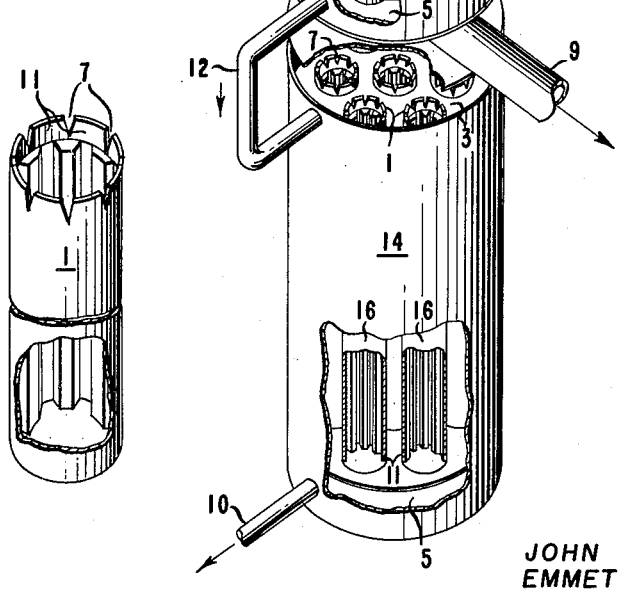
FIGURE 3 is a detailed view of one element of the apparatus shown in FIGURE 2.

Referring to FIGURES 2 and 3, two vertically aligned units are employed. The upper unit is identical with the apparatus illustrated in FIGURE 1. The lower unit is also identical with the apparatus above described with one major exception, viz., in place of the spiral protuberances, protuberances (see FIGURE 3) in the form of parallel, spaced ribs 11, extending for substantially the length of each column, are distributed around the inner walls of the columns. The outlet from the reservoir of the upper unit is connected thru duct 12 to the fluid inlet of the lower unit.

In operation, the monomeric bis-2-hydroxy ethyl terephthalate, or a very low molecular polymer thereof having an intrinsic viscosity of 0.03–0.06, is introduced as a continuous liquid stream and passes by reason of gravity downwardly over the inner walls of columns 1 as described above. The temperature of the columns in this unit is maintained at 240°–315° C. by circulating a suitable heating medium such as heated oil, "Dowthern" A, P-Cymene, etc. around the columns. A pressure of 5–15 millimeters of mercury is applied by pulling a vacuum thru vacuum duct 9. After traversing the columns of the upper unit, 60%–85% of the excess ethylene glycol vapors have been removed and the resulting polymerizable liquid has an intrinsic viscosity of 0.08 to 0.15. From the reservoir of the upper unit the liquid is fed to the feed plate of the lower unit from which it overflows thru the V-shaped weirs onto the inner surface of the columns, wetting the vertical channels completely to form a moving film flowing downwardly and into the reservoir below the columns. The temperature of the columns in the lower unit is maintained at 290°–350° C., and the pressure at 0.1–5 millimeters of mercury. The resulting prepolymer has a viscosity of 0.15–0.40.

The severity of temperature and pressure reduction conditions employed to produce a prepolymer of desired intrinsic viscosity will depend on the size and design of the apparatus. In commercial practice, a vertical enclosure having a multiplicity of columns (up to several hundred) will be necessarily employed. The hollow vertical tubular column may be characterized by any type of protuberances defining symmetrically patterned channels which are effective to promote distribution of the downwardly flowing polymerizable liquid in the form of a thin film completely wetting the vertical wall surface. The preferred embodiments are helical (spiral) and vertical (finned) channels as shown in FIGURES 1 and 2 and multiple threads. The essential feature of this type of reactor is that channelling or by-passing is prevented.

The following examples will further illustrate the principles and practice of the present invention.

Table I
PREPOLYMERIZATION OF BIS-2-HYDROXY ETHYL TEREPHTHALATE

| Ex. | Type column employed | Temp. of monomer [1] entering system, °C. | Temp. of column, °C. | Pressure mm.Hg | Rate of monomer [1] feed lbs./hr. | Intrinsic viscosity of monomer [1] | Intrinsic viscosity of final product | Increase in Intrinsic viscosity |
|---|---|---|---|---|---|---|---|---|
| 1 | Helical | 200 | 260 | 13.0 | 0.73 | 0.03 | 0.10 | 0.07 |
| 2 | ----do---- | 200 | 260 | 7.5 | 1.7 | 0.06 | 0.09 | 0.03 |
| 3 | ----do---- | 200 | 285 | 14.0 | 1.0 | 0.06 | 0.10 | 0.04 |
| 4 | ----do---- | 200 | 280 | 21.0 | 6.5 | 0.06 | 0.09 | 0.03 |
| 5 | ----do---- | 200 | 278 | 14.0 | 5.0 | 0.06 | 0.09 | 0.03 |
| 6 | ----do---- | 200 | 275 | 16.0 | 4.0 | 0.06 | 0.11 | 0.05 |
| 7 | ----do---- | 200 | 278 | 24.0 | 9.7 | 0.06 | 0.10 | 0.04 |
| 8 | ----do---- | 200 | 285 | 17.0 | 4.7 | 0.06 | 0.10 | 0.04 |
| 9 | ----do---- | 272 | 295 | 2.0 | 5.0 | 0.21 | 0.29 | 0.08 |
| 10 | ----do---- | 267 | 275 | 1.5 | 3.25 | 0.16 | 0.25 | 0.09 |
| 11 | ----do---- | 268 | 277 | 2.2 | 3.2 | 0.24 | 0.31 | 0.07 |
| 12 | ----do---- | 276 | 297 | 2.6 | 3.6 | 0.24 | 0.32 | 0.08 |
| 13 | ----do---- | 271 | 282 | 2.0 | 6.5 | 0.11 | 0.20 | 0.09 |
| 14 | ----do---- | 273 | 282 | 4.5 | 3.6 | 0.12 | 0.21 | 0.09 |
| 15 | Vertical (finned). | 275 | 275 | 1.4 | 5.7 | 0.21 | 0.25 | 0.04 |
| 16 | ----do---- | 275 | 297 | 1.4 | 0.21 | 0.21 | 0.28 | 0.07 |
| 17 | ----do---- | 272 | 275 | 1.4 | 3.6 | 0.25 | 0.31 | 0.06 |
| 18 | ----do---- | 272 | 295 | 1.6 | 1.8 | 0.25 | 0.33 | 0.08 |
| 19 | ----do---- | 272 | 295 | 1.8 | 7.6 | 0.25 | 0.29 | 0.04 |
| 20 | Quadruple thread. | 287 | 276 | 0.9 | 3.6 | 0.22 | 0.29 | 0.07 |
| 21 | ----do---- | 300 | 300 | 0.8 | 6.8 | 0.22 | 0.27 | 0.05 |
| 22 | ----do---- | 272 | 292 | 1.5 | 9.0 | 0.19 | 0.25 | 0.06 |
| 23 | ----do---- | 272 | 295 | 1.4 | 6.0 | 0.19 | 0.26 | 0.07 |
| 24 | ----do---- | 272 | 275 | 1.8 | 4.0 | 0.16 | 0.22 | 0.06 |
| 25 | ----do---- | 295 | 295 | 1.7 | 4.6 | 0.16 | 0.23 | 0.07 |
| 26 | ----do---- | 290 | 315 | 1.6 | 4.6 | 0.16 | 0.26 | 0.10 |

[1] For partially polymerized bis-2-hydroxy ethyl terephthalate.

EXAMPLES 1–26

The following examples were designed to show the effectiveness of forming a prepolymer of bis-2-hydroxy ethyl terephthalate by means of a film process utilizing several types of symmetrically patterned vertical columns. The apparatus used in Examples 1–26 is similar in design to that illustrated in FIGURE 1 with the modification that the tubular column designs differ; a helical (spiral) configuration being employed in Examples 1–14, a vertical (fin) in Examples 15–19, and quadruple threads in Examples 20–26. Monomer or partially polymerized polyethylene terephthalate having intrinsic viscosities of 0.03–0.25 was introduced into a vertical enclosure within a reaction chamber and allowed to overflow onto a base plate positioned over a hollow vertical column 3½ feet high, the upper part of which extended for a slight distance over the base plate. The base plate and hollow vertical column were interchangeable and easily removed to be replaced by different designs. The liquid monomer was heated by means of heated oil passed through the housing of the vertical enclosure and casing of the tubular column. Vacuum was applied through a vacuum line and the ethylene glycol vapor was removed from the system to a vapor take-off dome, glycol reflux system and glycol condenser, similar to existing systems. From the base plate, the material overflowed and by gravity flowed down the tubular hollow surface dripping from the bottom of the tube into a receiver pot affixed to the base plate. The receiver pot was chilled to stop any further action. The three preferred tubular column designs were evaluted. These were (a) helical (spiral), (b) vertical (finned), and (c) quadruple threads (i.e., four spiral channels leading from the top of the column). In Examples 1 to 14, the helical (spiral) column was employed. In Examples 15 to 19, the vertical (finned) column, and in Examples 20–26, the quadruple threaded column was employed.

Table I, below, lists the type column employed, temperature at which the monomer [1] was fed into the system, temperature of the vertical hollow tubular column, pressure in millimeters of mercury, rate of monomer [1] feed in pounds/hours, intrinsic viscosity of the monomer [1], intrinsic viscosity of the final product, and increase in intrinsic viscosity.

Although the process and apparatus of the present invention have been described specifically with respect to carrying out the polymerization of prepolymers of bis-2-hydroxy ethyl terephthalate, it should be emphasized that the present process and apparatus may be employed to carry out the polymerization of similar types of monomeric materials which polymerize with the evolution of vaporous by-products which are more volatile than the resulting desired product. Prepolymers which may be polymerized in the manner described herein include polyesters described in U.S. Patents Nos. 2,071,250 and 2,071,251, such as polyethylene sebacate, copolyesters of the type described and claimed in U.S. Patents Nos. 2,623,033 and 2,623,031, and modified polyethylene terephthalates, the modifier being selected from the following acids including esters thereof: isophthalic acid, hexahydroterephthalic acid, bibenzoic acid, sebacic acid, etc.

The process of the present invention represents a great advance in the mechanics of polymerization of liquid monomeric substances. The technique of subjecting liquid polymerizable materials to polymerization conditions while in the form of a flowing thin film has proven to great advantage from both an economic and technical standpoint. This process is equally adaptable in either a two- or three-stage polymerization process, being capable of both removing the major portion of the excess vaporous by-products from polymerization system and also producing a prepolymer of sufficiently high intrinsic viscosity which may be directly subjected to a finishing operation. In contrast with known processes, it performs the steps in a matter of a few minutes, thereby reducing the hold-up time of the polymerizable material in a reaction vessel. This reduction of relatively long hold-up times in the polymerization process greatly lessens the problem of degradation of polymeric material. This not only improves the quality of the material, but lessens the need for costly and time-consuming filtration steps later on in the process.

We claim:

1. A process for continuously producing a prepolymer of bis-2-hydroxy ethyl terephthalate which comprises continuously flowing a polymerizable liquid from the group ---
[1] Or partially polymerized bis-2-hydroxy ethyl terephthalate of low molecular weight.

consisting of bis-2-hydroxy ethyl terephthalate and low molecular weight polymers thereof having an intrinsic viscosity not greater than 0.25, downwardly and solely by force of gravity over a substantially vertical stationary surface provided with protuberances defining symmetrically patterned channels effective to promote distribution of the liquid as a film over substantially the entire area of said surface, maintaining the film under an elevated temperature and reduced pressure effective to promote polymerization as the film flows down said surface and to form a liquid polymer having an intrinsic viscosity not greater than 0.4, continuously removing evolved vaporous by-product in a stream counter-current to the direction of flow of said film, and continuously removing prepolymer from said surface at the lower extremity thereof.

2. A process for continuously producing a prepolymer of bis-2-hydroxy ethyl terephthalate which comprises continuously flowing a polymerizable liquid from the group consisting of bis-2-hydroxy ethyl terephthalate and low molecular weight polymers thereof having an intrinsic viscosity not greater than 0.25, downwardly and solely by force of gravity over a substantially vertical stationary cylindrical surface provided with protuberances defining symmetrically patterned channels effective to promote distribution of the liquid as a film over substantially the entire area of said surface, maintaining the film under an elevated temperature and reduced pressure effective to promote polymerization as the film flows down said surface and to form a liquid polymer having an intrinsic viscosity not greater than 0.4, continuously removing evolved vaporous by-product in a stream counter-current to the direction of flow of said film, and continuously removing prepolymer from said surface at the lower extremity thereof.

3. A process for continuously producing a prepolymer of bis-2-hydroxy ethyl terephthalate which comprises continuously flowing a polymerizable liquid from the group consisting of bis-2-hydroxy ethyl terephthalate and low molecular weight polymers thereof having an intrinsic viscosity not greater than 0.25, downwardly and solely by force of gravity over a substantially vertical stationary cylindrical surface provided with spiral grooves effective to promote distribution of the liquid as a film over substantially the entire area of said surface, maintaining the film under an elevated temperature and reduced pressure effective to promote polymerization as the film flows down said surface and to form a liquid polymer having an intrinsic viscosity not greater than 0.4, continuously removing evolved vaporous by-product in a stream counter-current to the direction of flow of said film, and continuously removing prepolymer from said surface at the lower extremity thereof.

4. A process for continuously producing a prepolymer of bis-2-hydroxy ethyl terephthalate which comprises continuously flowing a polymerizable liquid from the group consisting of bis-2-hydroxy ethyl terephthalate and low molecular weight polymers thereof having an intrinsic viscosity not greater than 0.25, downwardly and solely by force of gravity over a substantially vertical stationary cylindrical surface provided with vertically extending, spaced, parallel ribs effective to promote distribution of the liquid as a film over substantially the entire area of said surface, maintaining the film under an elevated temperature and reduced pressure effective to promote polymerization as the film flows down said surface and to form a liquid polymer having an intrinsic viscosity not greater than 0.4, continuously removing evolved vaporous by-product in a stream counter-current to the direction of flow of said film, and continuously removing prepolymer from said surface at the lower extremity thereof.

5. A process for continuously producing a prepolymer of bis-2-hydroxy ethyl terephthalate which comprises continuously flowing a polymerizable liquid from the group consisting of bis-2-hydroxy ethyl terephathalate and low molecular weight polymers thereof having an intrinsic viscosity not greater than 0.06, downwardly and solely by force of gravity over a substantially vertical stationary cylindrical surface provided with spiral grooves effective to promote distribution of the liquid as a film over substantially the entire area of said surface, maintaining the film at a temperature of from 260°–315° C., and under a pressure of 5–15 millimeters of mercury to form liquid prepolymer having an intrinsic viscosity of 0.08 to 0.15, continuously removing evolved vaporous by-product in a stream counter-current to the direction of flow of said stream; continuously flowing said liquid prepolymer downwardly and solely by force of gravity over a substantially vertical stationary cylindrical surface provided with vertically extending, spaced, parallel ribs effective to promote distribution of said liquid prepolymer as a film over substantially the entire area of said surface, maintaining the film of prepolymer at a temperature of from 290°–350° C. and under a pressure of 0.1–5 millimeters of mercury to form a prepolymer having an intrinsic viscosity of 0.15–0.40, continuously removing evolved vaporous by-product in a stream counter-current to the direction of flow of the film of liquid prepolymer, and continuously removing prepolymer from said surface at the lower extremity thereof.

References Cited by the Examiner

UNITED STATES PATENTS

| | | | |
|---|---|---|---|
| 2,504,488 | 4/50 | Antonio et al. | 23—285 |
| 2,720,505 | 10/55 | Caldwell | 260—75 |
| 2,727,882 | 12/55 | Caldwell | 260—75 |
| 2,758,915 | 8/56 | Vodonik | 23—285 |
| 2,779,752 | 1/57 | Vining | 260—95 XR |
| 2,822,348 | 2/58 | Haslam | 260—75 |
| 2,828,290 | 3/58 | Caldwell | 260—75 |
| 2,964,391 | 12/60 | Benson | 260—75 |
| 2,973,341 | 2/61 | Hippe et al. | 260—75 |
| 3,057,702 | 10/62 | Pierce et al. | 260—75 XR |

WILLIAM H. SHORT, *Primary Examiner.*

MILTON STERMAN, PHILIP MANGAN, HAROLD N. BURSTEIN, LOUISE P. QUAST, *Examiners.*